US012768930B2

(12) United States Patent
Rezaei et al.

(10) Patent No.: US 12,768,930 B2
(45) Date of Patent: Oct. 20, 2026

(54) POSITIONING METHODS, POSITIONING DEVICE, AND SYSTEM

(71) Applicant: u-blox AG, Thalwil (CH)

(72) Inventors: Farshid Rezaei, Malmö (SE); Matthias Mahlig, Berlin (DE); Timon Merk, Berlin (DE)

(73) Assignee: u-blox AG, Thalwil (CH)

( * ) Notice: Subject to any disclaimer, the term of this patent is extended or adjusted under 35 U.S.C. 154(b) by 258 days.

(21) Appl. No.: 18/541,753

(22) Filed: Dec. 15, 2023

(65) Prior Publication Data

US 2024/0201308 A1 Jun. 20, 2024

(30) Foreign Application Priority Data

Dec. 15, 2022 (EP) .................................... 22213838

(51) Int. Cl.
*G01S 5/02* (2010.01)
*G01S 5/00* (2006.01)

(52) U.S. Cl.
CPC .......... *G01S 5/0221* (2013.01); *G01S 5/0036* (2013.01)

(58) Field of Classification Search
None
See application file for complete search history.

(56) References Cited

U.S. PATENT DOCUMENTS

2019/0362237 A1* 11/2019 Choi ...................... G06N 3/084
2021/0368470 A1* 11/2021 Schaepperle ......... H04W 64/00
2023/0144796 A1* 5/2023 DePoy .................. G06N 20/00 706/12
2024/0295625 A1* 9/2024 Hasegawa ............. G01S 5/0263
2025/0167865 A1* 5/2025 Barbu .................. H04W 24/10

FOREIGN PATENT DOCUMENTS

WO WO 2022/155244 7/2022
WO WO 2022/203761 9/2022

OTHER PUBLICATIONS

Extended European Search Report in European Appln. No. 22213838.0, mailed on Jun. 13, 2023, 10 pages.
Salcic et al., "Mobile Station Positioning using GSM Cellular Phone and Artificial Neural Networks," Wireless Personal Communications, Sep. 1, 2000, 14(3):235-254.

* cited by examiner

*Primary Examiner* — Gennadiy Tsvey
(74) *Attorney, Agent, or Firm* — Fish & Richardson P.C.

(57) ABSTRACT

The present disclosure relates to a positioning method, performed by a positioning device. An example method includes receiving a signal from a mobile device; determining a positioning information of the mobile device based on the received signal; and providing the determined positioning information of the mobile device to a positioning engine. The method further includes obtaining an offset between the determined positioning information and an estimated positioning information determined by the positioning engine; and training a positioning algorithm of the positioning device based on the obtained offset.

19 Claims, 4 Drawing Sheets

POSITIONING METHODS, POSITIONING DEVICE, AND SYSTEM

CROSS-REFERENCE TO RELATED APPLICATION(S)

This application claims priority to European Application No. 22213838.0, filed on Dec. 15, 2022, the contents of which are incorporated herein by reference in their entirety.

TECHNICAL FIELD

This disclosure relates to positioning methods performed by a positioning device and a system comprising a positioning device and a positioning engine. The disclosure further relates to a corresponding positioning device, system, computer program, and computer-readable storage medium.

BACKGROUND ART

Positioning methods and devices for determining a position of a device, e.g. a mobile device, has become a very important and widely implemented tool in nearly all fields of industries and private life. Due to varying environments and different kinds of obstacles, an accuracy of such determined positions often may be unreliable, which in today's use of such positioning methods and devices may be a rather unsatisfying or even dangerous issue.

Therefore, it is an object of the present disclosure to improve accuracy of known positioning methods and positioning devices.

SUMMARY OF THE INVENTION

The above-mentioned object is solved by the subject-matter of the attached independent claims. Further embodiments are disclosed in the attached dependent claims.

A positioning method, performed by a positioning device, comprises the following steps:

- receiving a signal from a mobile device;
- determining a positioning information of the mobile device based on the received signal;
- providing the determined positioning information of the mobile device to a positioning engine;
- obtaining an offset between the determined positioning information and an estimated positioning information determined by the positioning engine;
- training a positioning algorithm of the positioning device based on the obtained offset.

An advantage of the positioning method presented herein is that a positioning algorithm is obtained, through training, which provides a better accuracy for determining a position of the mobile device or any other device. The positioning algorithm of the positioning device may be trained based on an offset, by which the positioning information of the mobile device, determined by the positioning device, differs from a positioning information of the mobile device estimated by the positioning engine. The positioning engine can estimate the positioning information with a higher accuracy, for example based on further data or higher complexity of the estimating of the positioning information. The positioning device can then improve the accuracy of the positioning algorithm and corresponding results by training said positioning algorithm based on said offset.

The received signal may be any signal which can be used to determine positioning information of the mobile device.

The positioning information may include any information, based on which a position of the mobile device may be determined. In particular, the positioning information may be information from which a distance between the positioning device and the mobile device may be determined, and/or from which a distance and direction between the positioning device and the mobile device may be determined. Therewith, 2-dimensional and/or 3-dimensional positioning may be performed. The positioning information for both 2D and 3D positioning may be angles, distances, or a combination of both derived from the received signal. Further explanation and examples thereof are provided in the following.

The estimated positioning information may be estimated based on the positioning information provided by the positioning device to the positioning engine, and may further be based on any further information that allows an estimating of such positioning information through the positioning engine. In particular, this further information may include further information provided by further positioning devices and/or the mobile device and/or information stored by the positioning engine. For example, at least three angles or distances may be used for 2D positioning and at least four angles or distances may be used for 3D positioning. The same numbers of angles/distances may be used for a combination of angles and distances as positioning information for the respective 2D/3D positioning. Further examples thereof are provided in the following.

The positioning algorithm may be any trainable algorithm for determining the position of the mobile device based on the positioning information. In particular, the positioning algorithm may have adjustable weights, which, when the offset between the output of the algorithm and the corrected positioning information is known, are adjusted in order to improve the accuracy of results of the positioning algorithm.

According to at least one embodiment, the positioning algorithm comprises a static algorithm and an adaptive machine learning algorithm, and the training the positioning algorithm of the positioning device based on the obtained offset comprises: training the adaptive machine learning algorithm based on the obtained offset.

An advantage thereof is that only a part of the positioning algorithm is required to be trained: the adaptive machine learning algorithm. This can improve efficiency and training speed of training the positioning algorithm. With other words, the static algorithm can be used to generally determine a default positioning information of the mobile device, the result of which can be manipulated with the trainable adaptive machine learning algorithm. Static in this context means that it may be pre-trained, but not further trained in the field. Adaptive in this context means that the algorithm is trainable in order to improve positioning accuracy According to at least one embodiment, the static algorithm comprises a machine learning model with a higher complexity than the adaptive machine learning model, or the static algorithm comprises a super resolution algorithm.

This way, the adaptive machine learning model may in particular be kept comparatively simple. An advantage thereof is that efficiency and speed of training the positioning algorithm may further be improved.

According to at least one embodiment, the adaptive machine learning algorithm may comprise a stochastic gradient descent linear regression model.

The stochastic gradient descent linear regression model is an example for a particularly suitable machine learning model to be used in the positioning algorithm. Results of determining a position using the trained positioning algorithm are particularly accurate when the stochastic gradient descent linear regression model is used.

According to an advantageous embodiment, training the positioning algorithm comprises: updating weights of the positioning algorithm based on the offset between the determined positioning information and the estimated positioning information.

According to at least one embodiment, the positioning information of the mobile device comprises an angle of arrival of the received signal and/or a distance between the mobile device and the positioning device.

The distance between the mobile device and the positioning device and/or the angle of arrival of the received signal may be used when 2-dimensional positioning, i.e., determining a location of the mobile device on a plane, and/or 3-dimensional, i.e., determining a location of the mobile device in a 3-dimensional space, is to be performed. Both distance and angle of arrival of the received signal may be obtained according to any mechanism known in the art.

According to at least one embodiment, the received signal is a wireless communication technology signal.

Any wireless communication technology signal may be used. For example, a Bluetooth signal, a WLAN signal, an UWB signal, any telecommunication signal, IEEE signal, or others known in the art, from which a distance and/or an angle of arrival may be determined, may be used in that context.

A positioning device comprises a receiver and a processor, wherein:

- the receiver is arranged to receive a signal from a mobile device;
- the processor is arranged to determine a positioning information of the mobile device based on the received signal;
- the processor is further arranged to provide the determined positioning information of the mobile device to a positioning engine;
- the processor is further configured to obtain an offset between the determined positioning information and an estimated positioning information determined by the positioning engine; and
- the processor is further configured to train a positioning algorithm of the positioning device based on the obtained offset.

Embodiments and advantages of the positioning device correspond, in general, to those discussed above with regard to the positioning method performed by the positioning device. Details thereof will not be repeated herein.

A positioning method, which is performed by a system comprising a positioning device and a positioning engine, comprises:

- receiving, by the positioning device, a signal from a mobile device;
- determining, by the positioning device, a positioning information of the mobile device based on the received signal;
- providing, by the positioning device, the determined positioning information of the mobile device to the positioning engine;
- determining, by the positioning engine, an estimated position of the mobile device based on the determined positioning information of the mobile device sent by the positioning device and based on further determined positioning information of the mobile device sent to the positioning engine by at least two further positioning devices;
- determining, by the positioning engine, an estimated positioning information of the mobile device based on the estimated position of the mobile device and a known position of the positioning device;
- obtaining, by the positioning device, an offset between the determined positioning information and the estimated positioning information determined by the positioning engine; and
- training, by the positioning device, a positioning algorithm of the positioning device based on the obtained offset.

The positioning device in the positioning method performed by the system may be, in particular, the positioning device described above. Embodiments and advantages of the positioning method performed by the system correspond, in general, to the above-mentioned embodiments of the positioning method performed by the positioning device and will not be repeated herein.

The offset between the determined positioning information determined by the positioning device and the estimated positioning information determined by the positioning engine may be received by the positioning device either in form of the offset directly from the positioning engine, or the estimated positioning information may be received by the positioning device from the positioning engine, and the positioning device itself obtains the offset from the estimated and the determined positioning information.

The estimated position of the mobile device relates to a ground truth location of the mobile device in the 2-dimensional plane or 3-dimensional space, in which the mobile device is to be located. According to the positioning method performed by the system, this position is estimated based on the determined positioning information of the mobile device sent by the positioning device and based on further determined positioning information of the mobile device sent to the positioning engine by at least two further positioning devices. In particular in the case of 2-dimensional positioning, the positioning information determined by two further positioning devices may be sufficient, such that positioning information of the mobile device determined by three positioning devices may be sufficient. In the case of 3-dimensional positioning, a positioning information of four positioning devices (i.e., the positioning device described above and three further positioning devices) may be sufficient to determine the estimated position. An advantage herein is that a reliable and significant offset between the estimated positioning information and the determined positioning information may be obtained.

The positioning engine may be arranged in a separate device, which communicates with the positioning device, or may be together with the positioning device in a common entity. To derive the estimated positioning information from the estimated position, the positioning engine knows the position of the positioning devices.

According to at least one advantageous embodiment, determining, by the positioning engine, the estimated position of the mobile device comprises: determining the estimated position of the mobile device based on a sum of the determined positioning information of the mobile device sent by the positioning device and the further determined positioning information of the mobile device sent by the at least two further positioning device.

A system comprising a positioning device as mentioned above and a positioning engine, wherein the positioning engine is arranged to determine the estimated positioning information of the mobile device based on the determined positioning information of the mobile device sent by the positioning device and based on further determined positioning information of the mobile device sent to the positioning engine by at least two further positioning device.

A computer program comprises instructions which, when executed by a computer, cause the computer to perform any of the methods discussed above, and/or their respective embodiments.

A computer-readable storage medium comprises the computer program mentioned above.

Embodiments and advantages of the system, the computer program, and the computer-readable storage medium correspond, in general, to the embodiments and corresponding advantages discussed above and will not be repeated herein.

Advantages and embodiments, which are described with respect to any of the above methods, device, or system, may be applied to any of the other aspects accordingly.

BRIEF DESCRIPTION OF DRAWINGS

The above-mentioned methods, positioning device, and system of the disclosure and their embodiments will be explained in more detail in the following with the aid of the drawings.

Elements and functional blocks having the same or similar function bear the same reference numerals throughout the drawings. Hence, their description is not necessarily repeated in following drawings.

In the figures:

FIG. 1 shows a method for performing positioning according to an exemplary embodiment of the disclosure;

FIG. 2 shows positioning information determined by anchors and estimated positioning information determined by a positioning engine according to an exemplary embodiment of the disclosure;

FIG. 3 shows an estimated position of a mobile device determined by a positioning engine according to an exemplary embodiment of the disclosure;

FIG. 4 shows offsets of anchors according to an exemplary embodiment of the disclosure; and FIG. 5 shows a schematic view of a system with a positioning device for performing positioning according to an exemplary embodiment of the disclosure.

DESCRIPTION OF EMBODIMENTS

Figure 1:
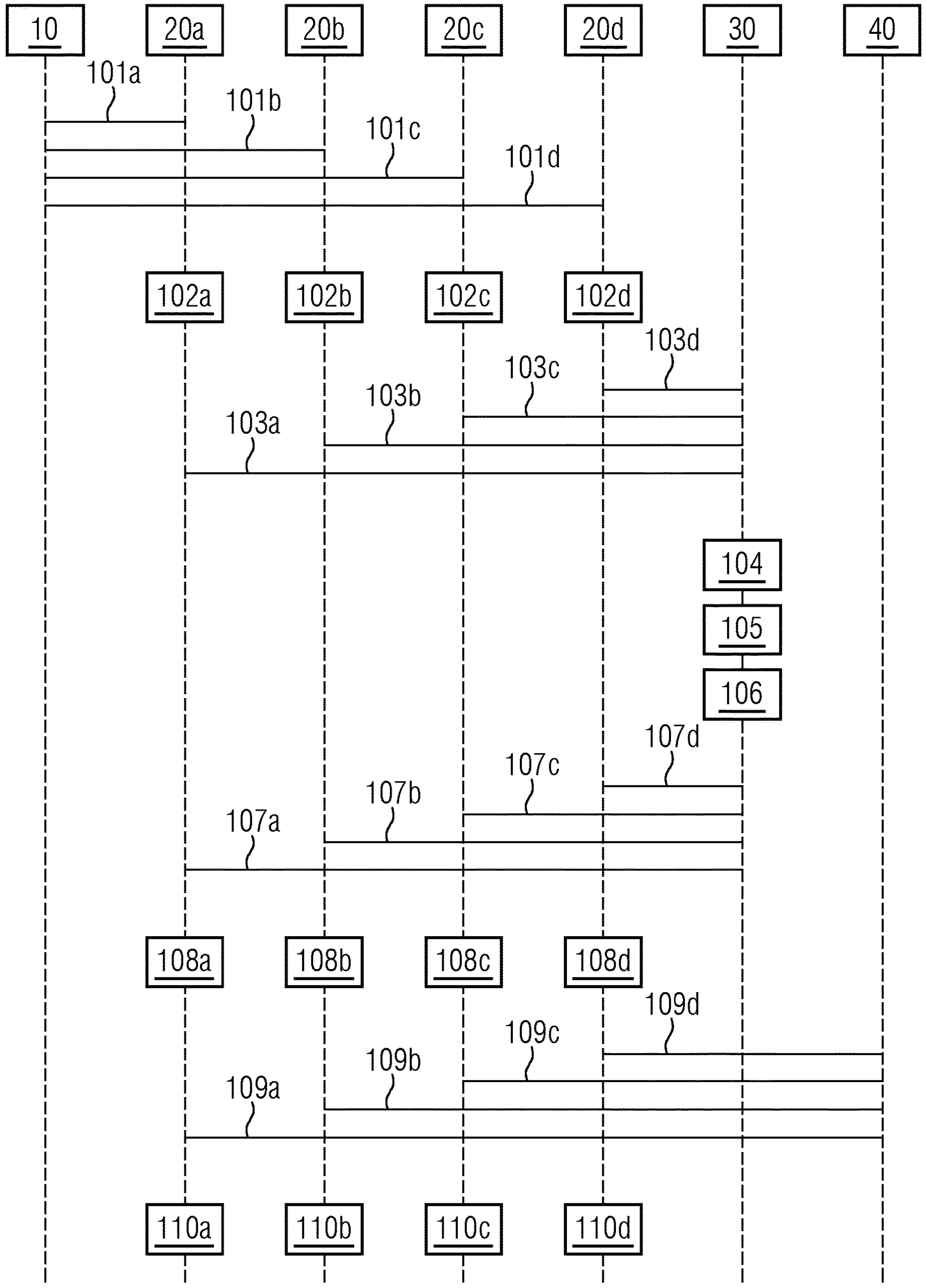

FIG. 1 shows a flowchart of a method for performing positioning according to an exemplary embodiment of the disclosure. The flowchart shows a simplified version for a 3-dimensional positioning of a mobile device in a 3-dimensional space. More complex versions thereof can of course be correspondingly implemented. A method for 2-dimensional positioning can also be correspondingly implemented.

According to FIG. 1, in steps 101*a*, 101*b*, 101*c*, 101*d*, anchors 20*a*, 20*b*, 20*c*, 20*d* respectively receive a wireless signal from a mobile device 10. This may be one signal broadcast by the mobile device 10 and received by each of the anchors 20*a*, 20*b*, 20*c*, 20*d*, or may be dedicated signals sent to each of the anchors 20*a*, 20*b*, 20*c*, 20*d*.

The received wireless signal may be, for example, a Bluetooth signal according to the Bluetooth standard. Bluetooth may be particularly advantageous in that it is often used in indoor positioning, where obstacles due to varying environments often occur. For example room sizes in which positioning systems are installed may differ, locations where entities of the positioning systems are installed may differ (e.g. on walls, ceiling, corners of a room, etc.), and reflective materials and signal attenuating obstacles are often present. Other signals, such as for example WiFi signals, UWB signals, or any other signals from which positioning information may be derived, may also be used.

After the signal is received by the anchors 20*a*, 20*b*, 20*c*, 20*d* respectively, each anchor 20*a*, 20*b*, 20*c*, 20*d* determines a positioning information of the mobile device 10 based on the received signal in steps 102*a*, 102*b*, 102*c*, 102*d*. In this exemplary embodiment shown in FIG. 1, the positioning information is an angle of arrival, AoA, at which the signal sent by the mobile device 10 is received by the respective anchor 20*a*, 20*b*, 20*c*, 20*d*. The positioning information may be determined according to any method known in the art.

Due to multipath propagation of signals, accuracy of algorithms to determine this positioning information depends on the environmental conditions of the positioning system and may be rather poorly, for example due to the aforementioned issues. Furthermore, accuracy may be impaired due to changing system performance over time (e.g. due to room reconstructions, furniture installation or removal, etc.). Moreover, an antenna tilt of the anchors might have been adjusted (intentionally or unintentionally). With the steps described with respect to this exemplary embodiment shown in FIG. 1, however, accuracy of a positioning of a mobile device by an anchor such as any of anchors 20*a*, 20*b*, 20*c*, 20*d* may be improved.

In steps 103*a*, 103*b*, 103*c*, 103*d*, each anchor 20*a*, 20*b*, 20*c*, 20*d* sends its respectively determined positioning information to a positioning engine 30. The positioning engine 30 is shown in this embodiment as a separate entity. However, the positioning engine 30 may also be combined with one of the anchors 20*a*, 20*b*, 20*c*, 20*d* as a common entity.

In a step 104, the positioning engine estimates a position of the mobile device 10 based on the positioning information determined by each of the anchors 20*a*, 20*b*, 20*c*, 20*d*. Details thereof are described with reference to FIGS. 2 and 3. The estimated position of the mobile device 10 relates to a ground truth location of the mobile device in the 3-dimensional space, in which the mobile device is to be located.

In a step 105, the positioning engine estimates positioning information of the mobile device 10 for each of the anchors 20*a*, 20*b*, 20*c*, 20*d* respectively. In this example, the estimated positioning information refers again to an AoA, in this case a corrected AoA for each anchor 20*a*, 20*b*, 20*c*, 20*d* based on the estimated position of the mobile device 10. The estimated positioning information is respectively determined for each of the anchors 20*a*, 20*b*, 20*c*, 20*d* based on the estimated position of the mobile device 10 and a known position of each of the anchors 20*a*, 20*b*, 20*c*, 20*d*. For this purpose, the position of each of the anchors 20*a*, 20*b*, 20*c*, 20*d* is known to the positioning engine 30. This knowledge may either be stored in a memory of the positioning engine, or may be provided to the positioning engine by each anchor, e.g. together with the determined positioning information of the mobile device or separately.

In a step 106, the positioning engine determines for each anchor 20*a*, 20*b*, 20*c*, 20*d* respectively an offset between the estimated positioning information and the determined positioning information. As offset, a difference between those pieces of positioning information, i.e., between the AoA as determined by the respective anchor 20*a*, 20*b*, 20*c*, 20*d* and the AoA as estimated by the positioning engine 30 for each respective anchor 20*a*, 20*b*, 20*c*, 20*d* is used.

In steps 107*a*, 107*b*, 107*c*, 107*d*, the positioning engine sends the respective offsets to the anchors 20*a*, 20*b*, 20*c*, 20*d*. Alternatively to the steps 106 and 107*a, b, c, d*, as described herein, it is also possible that the positioning engine 30 merely determines the estimated positioning information of the mobile device 10 for each anchor 20*a*, 20*b*, 20*c*, 20*d* and sends this estimated positioning information to the respective anchors 20*a*, 20*b*, 20*c*, 20*d*. In that case, each anchor 20*a*, 20*b*, 20*c*, 20*d* itself may determine the offset between the determined and the estimated positioning information.

In steps 108*a*, 108*b*, 108*c*, 108*d*, each anchor 20*a*, 20*b*, 20*c*, 20*d* trains a respective positioning algorithm of the anchor 20*a*, 20*b*, 20*c*, 20*d*. The positioning algorithm in this case comprises an adaptive machine learning algorithm which is trained based on the offset determined by the positioning engine 30. With other words, the positioning algorithm is trained with corrected results for the determined AoA. In case the AoA of a particular anchor has a significant offset, weights in the adaptive machine learning algorithm are adjusted, based on the training, to provide more accurate results when determining an AoA from a received signal. Therewith, a positioning algorithm is obtained in the anchors 20*a*, 20*b*, 20*c*, 20*d*, which has a higher accuracy for determining positioning information from a received signal of a mobile device.

For example in further steps 109*a*, 109*b*, 109*c*, 109*d*, the anchors 20*a*, 20*b*, 20*c*, 20*d* receive a wireless signal from a further mobile device 40. A positioning information, i.e., in the example described herein an AoA of each received signal, may be determined by the anchors 20*a*, 20*b*, 20*c*, 20*d* based on their trained positioning algorithms in steps 110*a*, 110*b*, 110*c*, 110*d*, thereby providing more accurate results for determining a position of the further mobile device 40 by each of the anchors 20*a*, 20*b*, 20*c*, 20*d* respectively. Nevertheless, also for the wireless signal received from the further mobile device 40, the training of the positioning algorithms may again be performed in accordance to steps 102 to 108. The positioning algorithms may permanently be improved this way, which in particular provides better results for positioning of a mobile device in case of any of the above-mentioned obstacles for positioning.

The exemplary embodiment shown in FIG. 1 and described above is kept relatively simple for the sake of an easily understandable description. More complexity may, however, be added in that more anchors and/or mobile devices may be present. Further it is also possible that just one anchor 20*a* has the trainable positioning algorithm and the others have just static positioning algorithms. In that case, only for that one anchor 20*a* the estimated positioning information is determined in step 105, the offset is determined in step 106, the offset is sent to this anchor 20*a* in step 107*a*, and only that anchor 20*a* trains its trainable positioning algorithm.

Alternatively to the embodiment for 3-dimensional positioning described with reference to FIG. 1 herein, also 2-dimensional positioning can be performed accordingly. In that case, a total of at least three anchors 20*a*, 20*b*, 20*c* would already be sufficient. The estimated positon of the mobile device 10 would be, in that case, a position of the mobile device 10 on a 2-dimensional plane.

Further alternatively, instead of AoA, the positioning information (both determined and estimated) may relate to a distance between the respective anchor 20*a*, 20*b*, 20*c* and the mobile device 10, or to a combination of distance and AOAs. This applies to both the 2-dimensional and 3-dimensional positioning discussed above, using, for example, the same number of pieces of positioning information from respective anchors: from a total of three anchors for 2D positioning and from a total of four anchors of 3D positioning.

Figure 2:
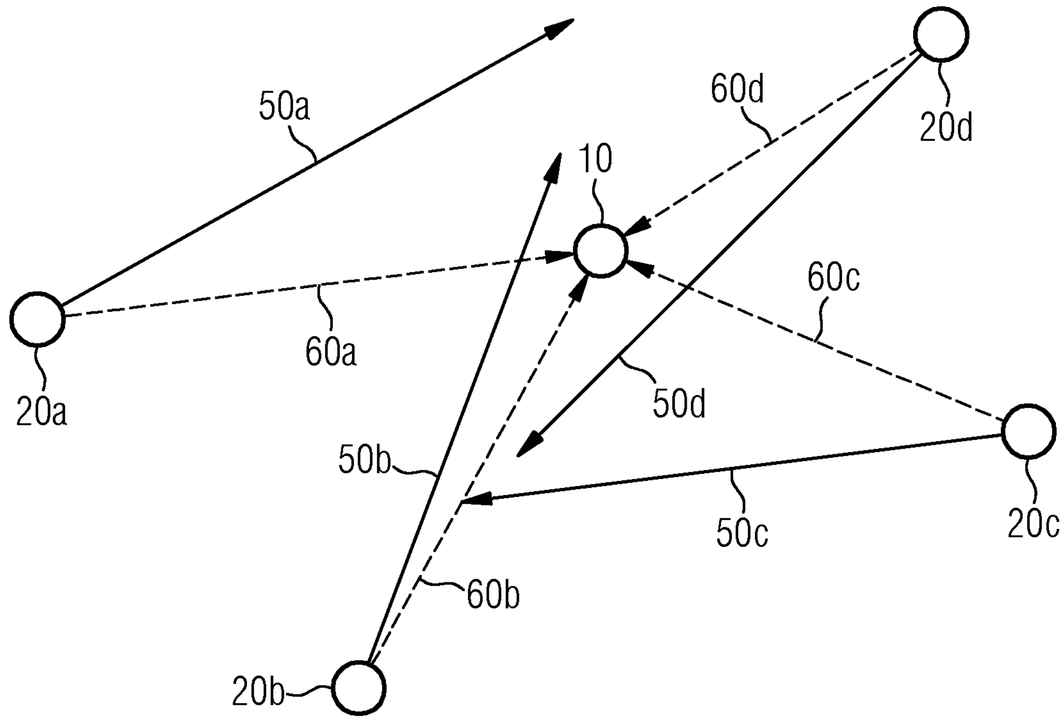

FIG. 2 shows positioning information determined by anchors from a received signal and estimated positioning information determined from an estimated position of a mobile device according to an exemplary embodiment of the disclosure.

A mobile device 10 is to be located in a 3-dimensional space in this example. The mobile device 10 is to be located by each of four anchors 20*a*, 20*b*, 20*c*, 20*d*. Mobile device 10 and anchors 20*a*, 20*b*, 20*c*, 20*d* may correspond to those described with reference to FIG. 1.

From a signal received by each anchor 20*a*, 20*b*, 20*c*, 20*d* from the mobile device 10, each anchor 20*a*, 20*b*, 20*c*, 20*d* respectively determines a respective positioning information, in this case a respective AoA, which are envisioned by arrows 50*a*, 50*b*, 50*c*, 50*d*.

From all four determined AoAs 50*a*, 50*b*, 50*c*, 50*d*, a position of the mobile device 10 is estimated using a sum of the respective determined AoAs 50*a*, 50*b*, 50*c*, 50*d*, in FIG. 2 the position at which the mobile device 10 is depicted. From said estimated position, corrected AoAs are derived, i.e., the estimated AoAs, which are envisioned by arrows 60*a*, 60*b*, 60*c*, 60*d*. The corrected AoAs are derived using the known position of the anchors 20*a*, 20*b*, 20*c*, 20*d* and the estimated position of the mobile device 10.

As can be seen from FIG. 2, some of the determined AoAs 50*a*, 50*b*, 50*c*, 50*d* have a rather significant offset from the fictitious AoAs 60*a*, 60*b*, 60*c*, 60*d* of the estimated position of the mobile device 10. The fictitious AoAs 60*a*, 60*b*, 60*c*, 60*d*, therefore, provide a significantly better accuracy for each of the anchors 20*a*, 20*b*, 20*c*, 20*d* concerning an actual position of the mobile device 10.

Figure 3:
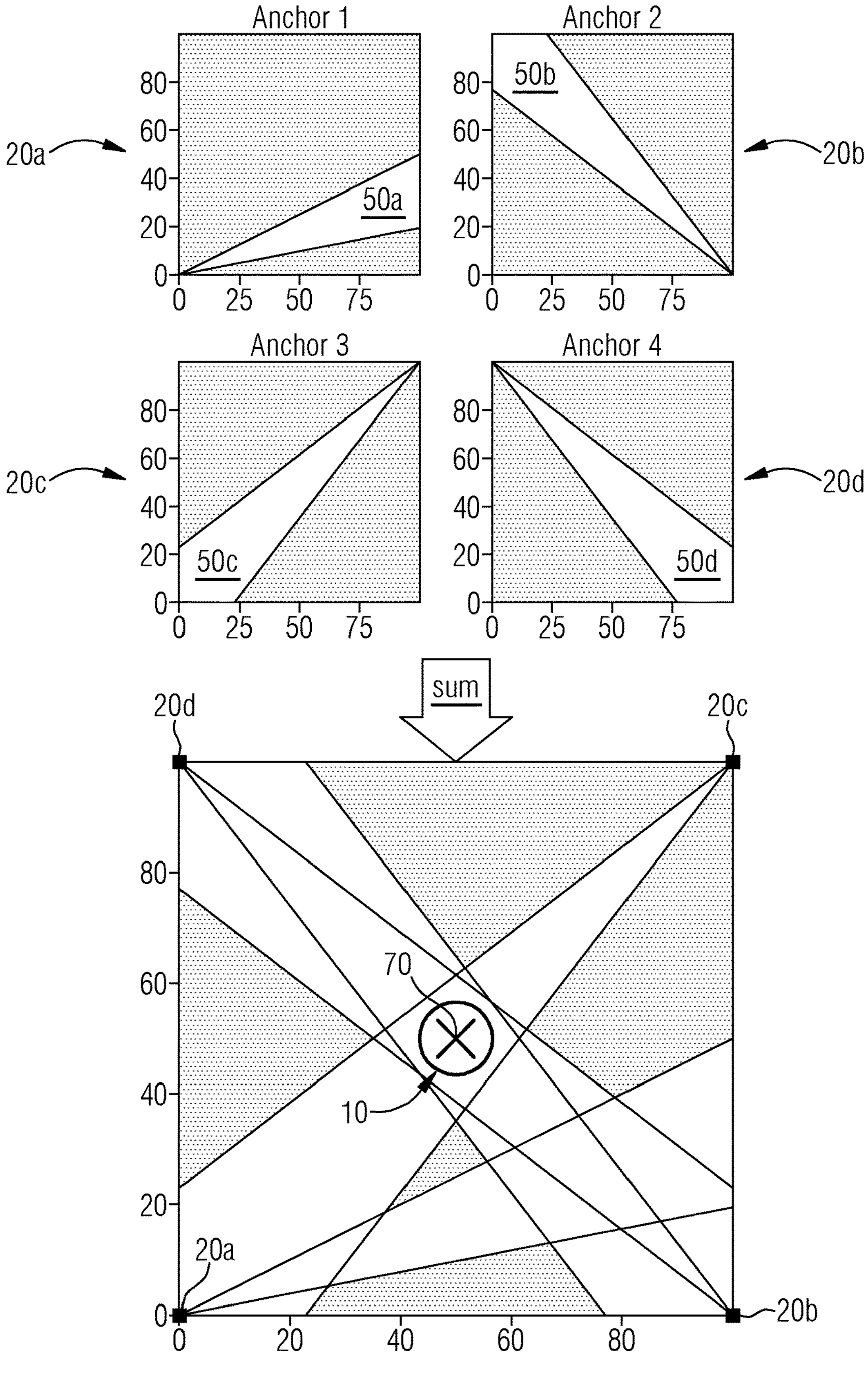

FIG. 3 shows an estimated position of a mobile device according to an exemplary embodiment of the disclosure. This visualization of the estimated position may be used for a better understanding of the above-discussed embodiments of FIG. 1 and FIG. 2.

On the left side in FIG. 3, four AoAs 50*a*, 50*b*, 50*c*, 50*d*, regarding a mobile device not shown herein, separately determined by one of four anchors 20*a*, 20*b*, 20*c*, 20*d* each are determined as a range of angles with some uncertainty (the uncertainty not being depicted in the graphs for illustrative reasons). Via a sum of those four separately determined AoAs 50*a*, 50*b*, 50*c*, 50*d*, a maximum 70 may be determined, which relates to a most probable location of the mobile device 10. This most probable location is used as the estimated position of the mobile device 10. As can be seen from FIG. 3, the AoA 50*a* determined by anchor 20*a* has a rather large offset with regard to the AoAs 50*b*, 50*c*, 50*d*, of the other anchors 20*b*, 20*c*, 20*d*, and hence has a comparatively large offset from the estimated position of the mobile device 10.

Figure 4:
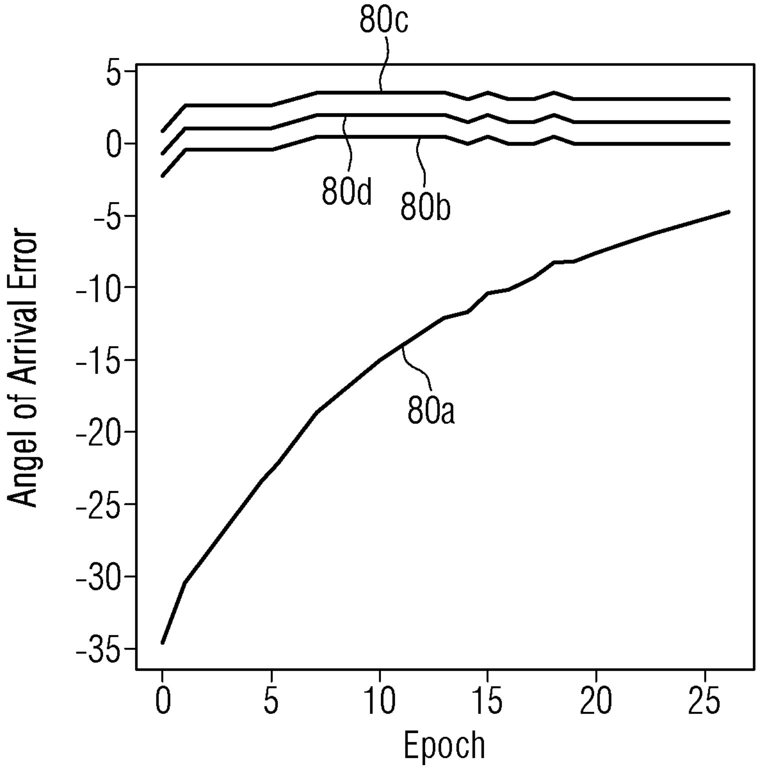

FIG. 4 shows offsets 80*a*, 80*b*, 80*c*, 80*d* of AoAs of anchors, e.g. such as those discussed with regard to FIG. 3, according to an exemplary embodiment of the disclosure. The offsets 80*a*, 80*b*, 80*c*, 80*d*, also describable as "error traces", relate to AoA errors over multiple training epochs according to a training of a positioning algorithm as described, for example, with reference to FIG. 1. Those offsets 80*a*, 80*b*, 80*c*, 80*d* correspond, in general, to the offsets of the anchors 20*a*, 20*b*, 20*c*, 20*d* shown in FIG. 3.

As can be seen in FIG. 4, anchors 20*b*, 20*c*, 20*d* each have a relatively small offset 80*b*, 80*c*, 80*d* in their determined AoA 50*b*, 50*c*, 50*d* regarding the estimated AoAs 60*b*, 60*c*, 60*d* from the estimated position of the mobile device 10. The anchor 20*a*, however, has, at epoch 0, a relatively large offset 80*a* and hence a relatively large offset between its determined AoA 50*a* and its corresponding estimated AoA 60*a*.

Over time, i.e., with increasing training epochs, the accuracy of the positioning algorithm of the anchor 20*a* improves and the offset 80*a*, therefore, decreases. In this example, in order to avoid an overfitting of the trainable positioning algorithm, a threshold of +/−5° of AoA offset is used, at which the respective positioning algorithm is not trained further. Hence, the curve of the offset 80*a* of the anchor 20*a* does not reach a smaller offset than −5° in this exemplary embodiment.

Figure 5:
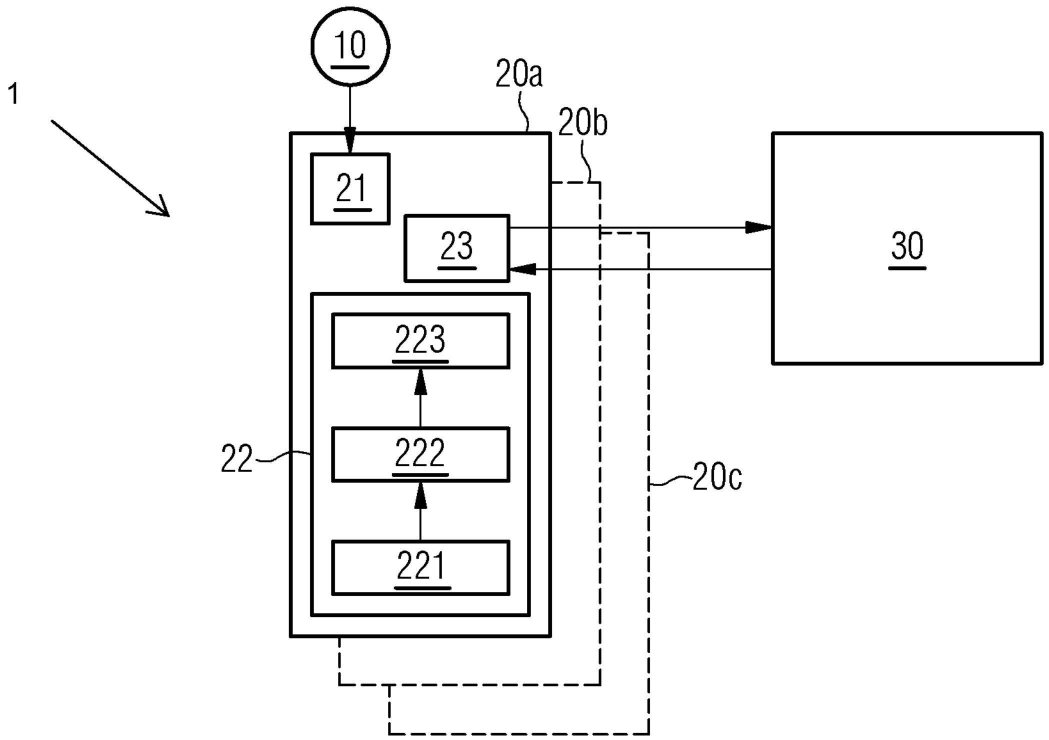

FIG. 5 shows a schematic view of a system 1 for performing positioning with a positioning device, i.e., an anchor 20*a*, and a positioning engine 30 according to an exemplary embodiment of the disclosure.

The anchor 20*a* comprises a receiver 21, which is arranged to receive a signal from a mobile device 10. Further anchors 20*b*, 20*c* are configured corresponding to the anchor 20*a*, description thereof is not repeated herein.

The anchor 20*a* further comprises a processor 22, which is configured to perform IQ sampling and preprocessing 221 on the signal received by the receiver 21. Any method known in the art of positioning signal processing may be used for IQ sampling and pre-processing in this case.

The processor 22 is further configured to run a static algorithm 222 for determining positioning information (e.g. AoA or distance) based on the received signal. The static algorithm may be a machine learning model with higher complexity. The machine learning model of the static algorithm may be a generic model, for example trained with simulation or augmented data. The machine learning model of the static algorithm could be already pre-trained for certain use cases, e.g. for an installation on a ceiling, a wall, a corner of a room, etc.) Alternatively, the static algorithm may be a super resolution algorithm. Static in this context means that it may be pre-trained, but not further trained in the field. The static algorithm is configured to determine a default positioning information based on the received signal.

The processor 22 is further configured to run an adaptive machine learning algorithm 223. The adaptive machine learning algorithm 223 may be a, compared to the static algorithm, significantly smaller adaptive machine learning algorithm, for example based on a single layer. The adaptive machine learning algorithm 223 therefore has low CPU requirements. The adaptive machine learning algorithm is configured to update weights based on offsets between positioning information determined by the anchor 20*a* and estimated positioning information determined by a positioning engine. Adaptive in this context means that the algorithm 223 is trainable in order to improve positioning accuracy, as discussed in detail for example with reference to FIG. 1.

The anchor 20*a* further comprises a transceiver 23, which is configured to communicate with the positioning engine 30. The transceiver 23 may relate to a different communication technology than the receiver 21, or may relate to the same communication technology. Accordingly, receiver 21 and transceiver 23 may be separate devices or may be the same device.

Via the transceiver 23, the anchor 20*a* is configured to send the determined positioning information to the positioning engine 30. The positioning engine, for example comprising a corresponding transceiver and a further processor, is configured to receive the positioning information from the anchor 20*a* and corresponding positioning information from further anchors 20*b*, 20*c*, and to estimate a position of the mobile device 10 based on the received pieces of positioning information. From the estimated position of the mobile device 10, the positioning device 30 is configured to determine estimated positioning information based on a known position of the anchor 20*a*. The positioning engine 30 is further configured to determine an offset between the positioning information received from the anchor 20*a* and the positioning information estimated by the positioning engine 30, and send the offset to the anchor 20*a*.

The anchor 20*a* is then able to train the adaptive machine leaning algorithm 223 based on the obtained offset, according to the embodiments described above.

Any features of the embodiments described with reference to any of the above-discussed Figures are readily combinable with the corresponding embodiments of the other Figures.

LIST OF REFERENCE SIGNS

| | |
|---|---|
| 10 | mobile device |
| 20a, b, c, d | anchor |
| 21 | receiver |
| 22 | processor |
| 221 | IQ sampling/pre-processing |
| 222 | static algorithm |
| 223 | adaptive machine learning algorithm |
| 23 | transceiver |
| 30 | positioning engine |
| 40 | further mobile device |
| 50a, b, c, d | arrow depicting determined AoA |
| 60a, b, c, d | arrow depicting estimated AoA |
| 70 | maximum |
| 80a, b, c, d | AoA offset |
| 101 to 110 | steps |

The invention claimed is:

1. A positioning method, performed by a positioning device, the method comprising:

receiving a signal from a mobile device;

determining a positioning information of the mobile device based on the received signal;

providing the determined positioning information of the mobile device to a positioning engine;

obtaining an offset between the determined positioning information and an estimated positioning information determined by the positioning engine, wherein the estimated positioning information is based on an estimated position of the mobile device and a known position of the positioning device, and wherein the estimated position of the mobile device is based on the determined positioning information of the mobile device; and training a positioning algorithm of the positioning device based on the obtained offset.

2. The positioning method according to claim 1, wherein the positioning algorithm comprises a static algorithm and an adaptive machine learning algorithm, and wherein training the positioning algorithm of the positioning device based on the obtained offset comprises:

training the adaptive machine learning algorithm based on the obtained offset.

3. The positioning method according to claim 2, wherein:

the static algorithm comprises a machine learning model with a higher complexity than the adaptive machine learning algorithm, or wherein the static algorithm comprises a super resolution algorithm.

4. The positioning method according to claim 2, wherein the adaptive machine learning algorithm comprises a stochastic gradient descent linear regression model.

5. The positioning method according to claim 1, wherein the training the positioning algorithm comprises:

updating weights of the positioning algorithm based on the offset between the determined positioning information and the estimated positioning information.

6. The positioning method according to claim 1, wherein the positioning information of the mobile device comprises at least one of an angle of arrival of the received signal or a distance between the mobile device and the positioning device.

7. The positioning method according to claim 1, wherein the received signal is a wireless communication technology signal.

8. The positioning method according to claim 3, wherein the adaptive machine learning algorithm comprises a stochastic gradient descent linear regression model.

9. The positioning method according to claim 8, wherein the training the positioning algorithm comprises:

updating weights of the positioning algorithm based on the offset between the determined positioning information and the estimated positioning information.

10. The positioning method according to claim 9, wherein the positioning information of the mobile device comprises at least one of an angle of arrival of the received signal or a distance between the mobile device and the positioning device.

11. A positioning device comprising:

a receiver arranged to receive a signal from a mobile device; and a processor; and a computer-readable storage medium coupled to the processor and storing instructions that, when executed by the processor, cause the processor to perform operations comprising:

determine a positioning information of the mobile device based on the received signal;

provide the determined positioning information of the mobile device to a positioning engine;

obtain an offset between the determined positioning information and an estimated positioning information determined by the positioning engine, wherein the estimated positioning information is based on an estimated position of the mobile device and a known position of the positioning device, and wherein the estimated position of the mobile device is based on the determined positioning information of the mobile device; and train a positioning algorithm of the positioning device based on the obtained offset.

12. A positioning method, performed by a system comprising a positioning device and a positioning engine, the positioning method comprising:

receiving, by the positioning device, a signal from a mobile device;

determining, by the positioning device, a positioning information of the mobile device based on the received signal;

providing, by the positioning device, the determined positioning information of the mobile device to the positioning engine;

determining, by the positioning engine, an estimated position of the mobile device based on the determined positioning information of the mobile device sent by the positioning device and based on further determined positioning information of the mobile device sent to the positioning engine by at least two further positioning devices;

determining, by the positioning engine, an estimated positioning information of the mobile device based on the estimated position of the mobile device and a known position of the positioning device;

obtaining, by the positioning device, an offset between the determined positioning information and the estimated positioning information determined by the positioning engine; and training, by the positioning device, a positioning algorithm of the positioning device based on the obtained offset.

13. The positioning method according to claim 12, wherein determining, by the positioning engine, the estimated position of the mobile device comprises:

determining the estimated position of the mobile device based on a sum of the determined positioning information of the mobile device sent by the positioning device and the further determined positioning information of the mobile device sent by the at least two further positioning devices.

14. A system comprising:

a positioning device comprising a receiver arranged to receive a signal from a mobile device, and a processor, and a computer-readable storage medium coupled to the processor and storing instructions that, when executed by the processor, cause the processor to perform operations comprising determining a positioning information of the mobile device based on the received signal;

providing the determined positioning information of the mobile device to a positioning engine;

obtaining an offset between the determined positioning information and an estimated positioning information determined by the positioning engine; and the positioning engine, wherein the positioning engine is arranged to determine the estimated positioning information of the mobile device based on an estimated position of the mobile device and a known position of the positioning device, and based on the determined positioning information of the mobile device sent by the positioning device and based on further determined positioning information of the mobile device sent to the positioning engine by at least two further positioning devices.

15. A non-transitory computer-readable storage medium storing instructions that, when executed by at least one processor of a positioning device, cause the at least one processor to perform operations comprising:

determine a positioning information of a mobile device based on a received signal from the mobile device;

provide the determined positioning information of the mobile device to a positioning engine;

obtain an offset between the determined positioning information and an estimated positioning information determined by the positioning engine, wherein the estimated positioning information is based on an estimated position of the mobile device and a known position of the positioning device, and wherein the estimated position of the mobile device is based on the determined positioning information of the mobile device; and train a positioning algorithm of the positioning device based on the obtained offset.

16. The non-transitory computer-readable storage medium according to claim 15, wherein the positioning algorithm comprises a static algorithm and an adaptive machine learning algorithm, and wherein training the positioning algorithm of the positioning device based on the obtained offset comprises:

training the adaptive machine learning algorithm based on the obtained offset.

17. The non-transitory computer-readable storage medium according to claim 16, wherein:

the static algorithm comprises a machine learning model with a higher complexity than the adaptive machine learning algorithm, or wherein the static algorithm comprises a super resolution algorithm.

18. The non-transitory computer-readable storage medium according to claim 16, wherein the adaptive machine learning algorithm comprises a stochastic gradient descent linear regression model.

19. The non-transitory computer-readable storage medium according to claim 15, wherein the training the positioning algorithm comprises:

updating weights of the positioning algorithm based on the offset between the determined positioning information and the estimated positioning information.

* * * * *